Figure 1:
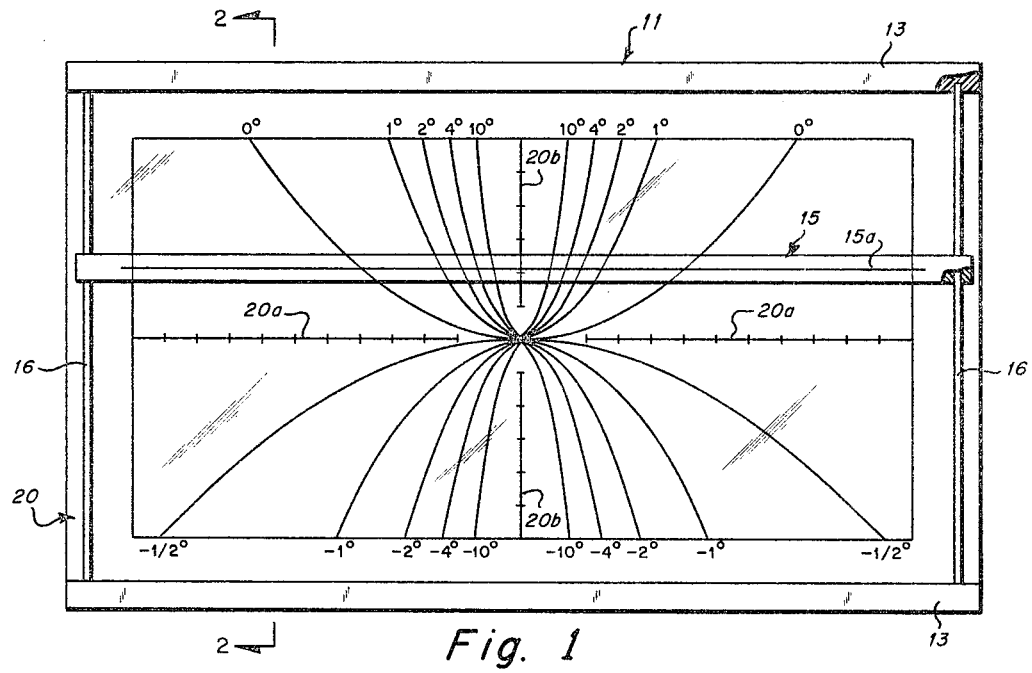

Aug. 16, 1966     D. BARRON     3,266,721

SONAR SLIDE RULE

Filed May 28, 1965     2 Sheets-Sheet 1

INVENTOR.
DANIEL BARRON
BY
*Henry Hansen*
*J. A. Cooke*
ATTORNEYS

INVENTOR.
DANIEL BARRON

United States Patent Office 3,266,721
Patented August 16, 1966

3,266,721
SONAR SLIDE RULE
Daniel Barron, 2139 Hartel Ave., Philadelphia, Pa.
Filed May 28, 1965, Ser. No. 461,227
5 Claims. (Cl. 235—61)

The invention described herein may be manufactured and used by or for the Government of the United States of America for governmental purposes without the payment of any royalties thereon or therefor.

The present invention relates to a slide rule and more particularly to a slide rule used during underwater target detection operations for determining optimum sonar transducer depths and for predicting sonar range.

One method for detecting, locating and classifying underwater targets embodies a helicopter equipped with airborne sonar equipment and a transducer having a 500-foot cable length cooperating therewith, the transducer thereby having the capability of being dipped below the surface of the water at various depths. One of the most important functions of the sonar operator is to determine how deep to dip the transducer in order to obtain the maximum area of coverage, more correctly termed—volumetric coverage. It should be understood that the time factor is of utmost importance in the detection of high speed targets. Therefore, it is important that the transducer be placed at the most effective least depth and not beyond since deeper dipping would result in an undue consumption of time without any concomitant efficiency in detection. Obviously, the proper initial positioning of the transducer will provide the underwater target with the least chance of escaping detection.

In order to determine the proper tactics, for example, localization, search, or formation (terms known in the art), for the detection of the underwater target it is important that the sonar operator knows the estimated sonar range (ESR) of the transducer when the same is operating at a particular depth. The estimated sonar range is defined as the range which will give 50 percent probability of detecting a target.

It is known that the behavior of sound in sea water, and therefore the performance of sonar equipment, is dependent among other things upon the temperature condition in the body of water in which the detection operation is taking place. The temperature condition in turn is dependent upon the depth to which reference is being made, the pressure effect at this depth and the surface temperature. Each of these factors is important in the determination of the best depth to operate the sonar equipment and in the prediction of the range which will be obtained when operated at this depth. Presently sonar operators either have the use of a bathythermograph (BT) which automatically measures the water temperature as a function of depth and provides a record which is called a bathythermogram or, alternatively, have previously obtained BT profiles for the particular area over which the helicopter is operating.

Given the data from the BT recorder or from the prior profiles, the operator subjectively chooses the depth at which the transducer is to be located and additionally subjectively estimates the range which is to be expected from the transducer at the selected depth. To aid in this subjective analysis, the operator may refer to charts and previous data, if available. A more objective method employed by the operator involves ray plotting. In this latter method an actual diagram is made of the sonar ray path. This diagram gives a picture of the paths of sound in and below the surface isothermal layer, the amount of refraction, reflection bounces, the inclination of the sound path which is refracted downward, the shadow zone, the depth of an initial contact for a particular range below the surface layer, and other information.

The plotted ray path is that of the "limiting ray" which is the ray which bounds the area of ensonified water in the thermocline, and is the ray that is used for range prediction.

Although these methods obtain the desired result, each of the aforementioned methods is inconvenient due to the limited time available in making the determination as to the best depth and estimated sonar range and also because of the limited space available in the helicopter for this data and plotting equipment. These problems are solved or minimized by the present novel slide rule which enables the sonar operator to rapidly and accurately determine the depth to which the transducer is to be dropped and the range to be expected by the transducer all of which information is obtained without resorting to any graphs, pages of tables or plotting equipment.

It is an object of the present invention to provide a sonar slide rule.

Another object of the present invention is to provide a sonar slide rule for determining the best depth to operate a transducer in the detection of underwater targets.

Still another object of the present invention is to provide a sonar slide rule which is capable of determining the best depth at which a transducer should be operated for the determination, detection and location of an underwater target and which will additionally provide information as to the range which may be expected from the transducer when the same operates at the selected depth.

A further object of the present invention is to provide a sonar slide rule which will quickly and accurately provide information as to the best depth to operate a deep-dipped sonar transducer during the location, detection and classification of underwater targets and to quickly and accurately provide information as to the range which may be expected to be obtained when the same is operated at that selected depth.

Still another object of the present invention is the provision of a lightweight, compact, inexpensive sonar slide rule capable of quickly and accurately providing information as to the best depth to operate a sonar transducer during the detection of underwater targets.

An additional object is to provide a sonar slide rule which will quickly and accurately determine the depth of the underwater target.

Various other objects and advantages will appear from the following description of an embodiment of the invention, and the novel features will be particularly pointed out hereinafter in connection with the appended claims.

Figures 3, 4:
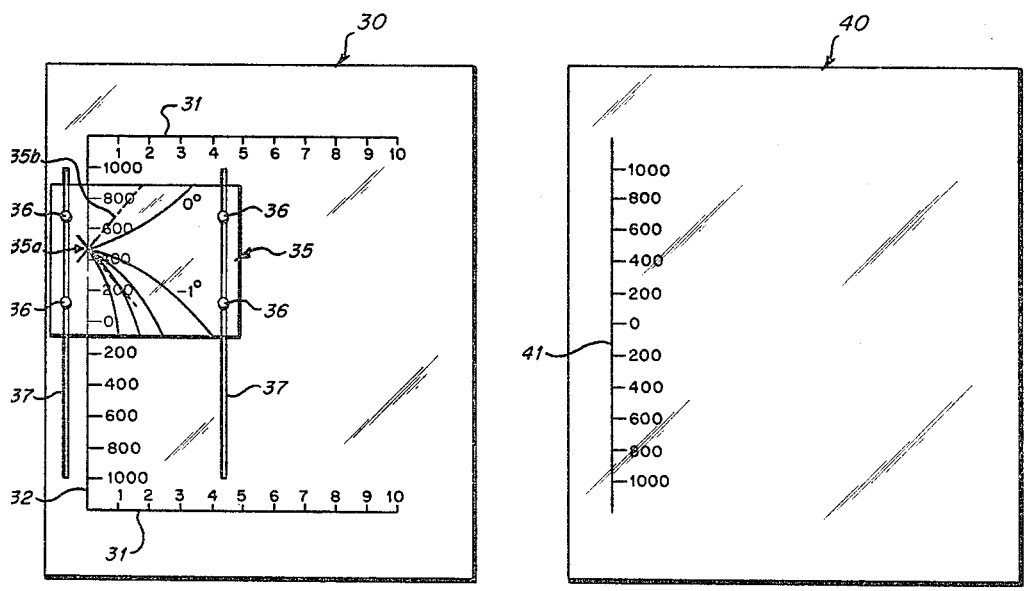
Figure 2:
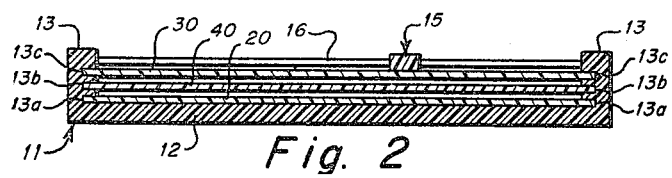
Figure 5:
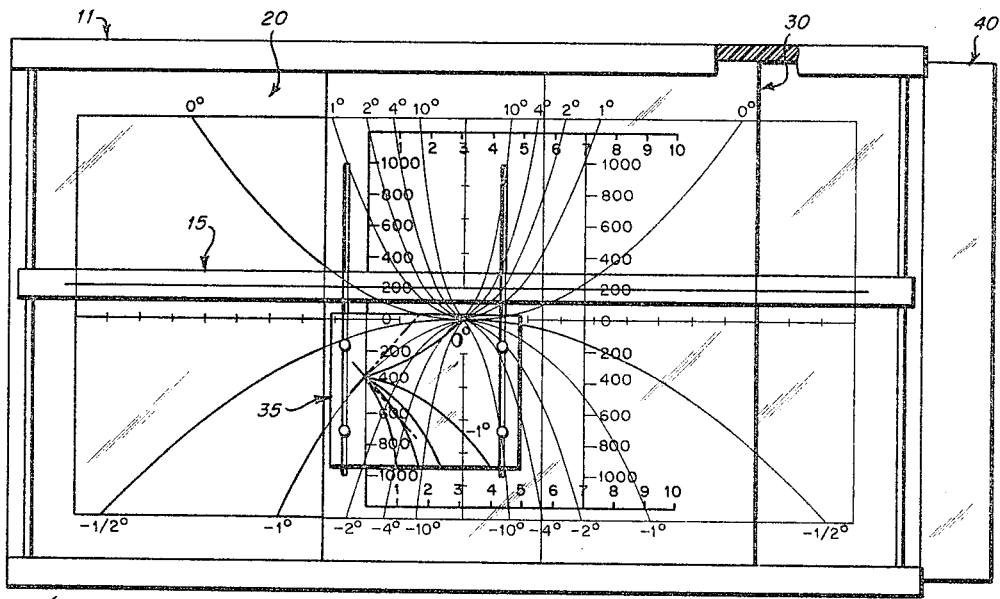
Figure 7A:
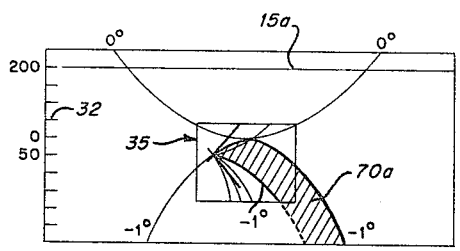
Figure 6A:
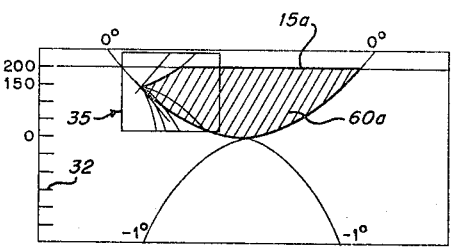
Figure 7B:
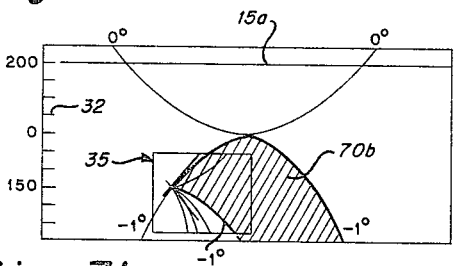
Figure 6B:
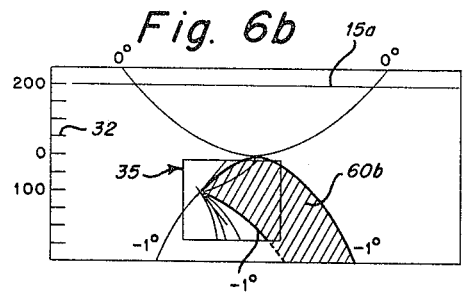

In the drawings:

FIG. 1 illustrates a front view of the slide rule body including a cursor and an inserted typical ray chart for the Middle Atlantic region, FIG. 2 is a cross-sectional view taken along the line 2—2 of FIG. 1 with all slides included, FIG. 3 illustrates the movable transducer slide including the area coverage slide, FIG. 4 illustrates the target slide, FIG. 5 illustrates a front view of the entire slide rule with all of the elements thereof arranged for computation, FIG. 6a is a schematic representation of the position of the area coverage slide and typical ray chart to determine the area ensonified when the transducer is located in the isothermal layer, FIG. 6b is a schematic representation of the position of the area coverage slide and typical ray chart to determine the area ensonified when the transducer is located in the thermocline, FIG. 7a is a schematic representation of the position of the area coverage slide and typical ray chart when the transducer is too shallow to obtain maximum area coverage, and FIG. 7b is a schematic representation of the position of the area coverage slide and typical ray chart when the transducer is at the best depth to obtain maximum area coverage.

The present invention makes use of data obtained from a bathythermograph (BT) which automatically measures the water temperature as a function of depth and provides a record called a bathythermogram. The present novel slide rule is based on three basic types of BT's which have been found in ocean waters to be prevalent approximately 80 percent of the time and are as follows:

Type 1—In this type the isothermal layer, which is a layer of water where there is no change in temperature with depth and which usually occurs near the surface, starts at the surface and has a negative gradient layer which is a negative rate of change of temperature with depth, below it.

Type 2—Here the isothermal surface layer has a negative gradient below it and a third isothermal layer below the negative gradient.

Type 3—Here the surface isothermal layer has a negative gradient below it and a second negative gradient forms a third layer.

The BT further provides information concerning the isothermal layer depth which is the depth at which the isothermal layer ends and the negative or positive gradient begins. This layer depth can be zero if no isothermal layer exists. Also provided is information relating to the thermocline depth, which is the depth measured from the surface down to the bottom of the first negative gradient. The thermocline layer per se is a layer of transition in which the temperature decreased rapidly with depth. As indicated above, it is this information from the bathythermograph with which the sonar operator begins his determination of best depth and expected range by utilizing the novel slide rule, now to be described.

Referring more specifically to FIGS. 1 and 2 of the drawings, the novel slide rule 10 comprises a stationary body portion 11 which includes a flat, rectangular-shaped base plate 12 having suitable width and length which in turn is provided with a pair of parallel longitudinally extending flanges 13 having slotted guides 13a, 13b and 13c formed therein for removably mounting a plurality of slides which are to be more fully described below. A horizontally extending cursor 15 is slidably mounted for vertical movement on guide pins 16 appropriately anchored within the flanges 13. The horizontal cursor 15 is constructed of transparent material on the face of which is marked a horizontal line 15a representing the surface of the water in which the detection operation is transpiring.

A slidably removable ray chart 20 is positioned within slotted guide 13a and assumes a fixed position when so located. The curves illustrated on chart 20 depict the paths of sound rays through water for various thermal gradients. The particular ray path chart illustrated is for sea water temperature having a range between 50° to 70° F. The horizontal axis 20a is graduated and measures distance in kiloyards. It also is vertically positioned at the bottom of the isothermal layer. The vertical axis 20b indicates depth and is graduated in units of 50 feet. The curves represent the actual path of acoustic rays (sound beams) for rate of temperature change per 100 feet, this rate being illustrated by numerals indicated adjacent the curves. Those above the horizontal axis 20a are for positive gradients, those below are for negative gradients. The method utilized for plotting these constant gradient curves employs Snell's Law and may be obtained from any standard text. For example, see "Fundamentals of Sonar" by J. W. Horton, published by the U.S. Naval Institute in 1957. Only representative gradient curves are illustrated.

It should be understood that although one such chart is illustrated, various numbers of charts could be provided. For example, a ray chart may be provided for sea water temperature range of from freezing to 50° F. and another from 70° to 90° F. and that these other ray charts may be slidably interchangeable with the ray chart herein disclosed and illustrated depending upon the body of water in which the operation is taking place.

FIG. 3 illustrates the transducer slide 30 which is constructed of transparent material and includes horizontal scales 31 printed thereon indicative of target range in kiloyards and a vertically extending scale 32 printed thereon indicating the transducer depth in feet. A vertically slidable area coverage slide 35 also of transparent material is operatively connected to the transducer depth slide 30 for vertical sliding movement through appropriate fasteners such as pins 36 which cooperate with a pair of parallel slots 37 formed in the transducer depth slide 30. The area coverage slide 35 has a series of ray curves in solid lines marked on the face thereon identical to the 0°, −1°, −2°, −4° and −10° curves of the chart 20 (right side). These rays intersect at a point 35a which is positioned above the transducer depth scale 32. Additionally, a broken line 35b is marked on the face of the area coverage slide and is indicative of the limiting beam angle of the particular transducer used in the operation. In this particular instance the transducer has an effective beam width angle of 18° and it should be understood that if transducers having different beam width angles are utilized this angular relationship would be changed on the area coverage slide. Although the beam angle appears on the drawings to be larger than the 18° value, it should be understood that the graphical presentation of the angle is adjusted to compensate for an abscissa in kiloyards and an ordinate in feet.

FIG. 4 illustrates the target slide 40 which is constructed of transparent material and has a vertical scale 41 marked on the face thereof indicative of the target depth in feet.

Referring to FIG. 2 it should be understood that the ray chart 20 is inserted within the guide slot 13a, the target slide 40 is inserted within the guide slot 13b, and the transducer slide 30 is positioned within the guide slot 13c.

FIG. 5 illustrates the various elements of the slide rule discussed above arranged in their operative position. The various manners in which the slide rule 10 is used will be described hereinafter by reference to this figure and particular examples.

I. *Determination of target range*

Let it be assumed that the bathythermograph provides information that the isothermal layer is 200 feet and that a 1° per 100 feet negative gradient (change in temperature) exists below the layer. Let it further be assumed that the transducer is to be dipped at a location 600 feet below the surface of the water and that the target is suspected to be at 700 feet below the surface of the water. Assume also that the body of water in which the operation is taking place has a temperature range of 50° to 70° F. The range is calculated as follows:

The ray chart 20 is selected and inserted within the frame 11 of the slide rule 10 since this ray chart is the proper one for the 50° to 70° F. water temperature range. The horizontal cursor 15 is then moved vertically until the line 15a intersects the 200 foot mark on the ray chart 20. This line 15a now represents the surface of the water and it is from this line that all depths will be measured.

The transducer slide 30 is now moved until the −1° gradient curve on the left side of the ray chart 20 intersects the transducer depth scale 32 at the 400 foot mark. This 400 foot mark is actually indicative of a 600 foot depth below the surface of the water where the transducer is to be placed.

The target slide 40 is moved until the −1° gradient curve on the right side of the ray chart 20 intersects the target depth scale at the 500 foot mark. This 500 foot mark is actually indicative of a 700 foot depth below the surface of the water which is the suspected depth of the target.

The predicted range of the target is read from the target scale 31 on the transducer slide and is at the point where the vertical line on the target depth scale 41 intersects the horizontal range scale 31. This occurred in the present case, as viewed in FIG. 5, at 7 kiloyards.

In the instance where the target is suspected to be within the isothermal layer, that is, between the horizontal line 15a on the horizontal cursor 15 and the horizontal axis 20a on the ray chart 20, the transducer slide 30 is positioned as above and the target depth slide 30 is moved until the target depth scale 32 intersects the 0° isothermal ray at the mark thereon indicative of the depth below the surface at which the target is suspected to be. The range is then indicated at the point where the vertical line of the target depth scale 41 intersects the range scale 31 on the transducer slide 30.

II. *Determination of target depth*

The procedures described above may be modified to determine the target depth instead of the range of the target. In this calculation let it be assumed that the same bathythermograph conditions are present, that the transducer is placed at a depth of 600 feet below the surface of the water, that is, 400 feet below the isothermal layer and that the range of the target obtained from a collateral sonar device indicates a range of 7 kiloyards. The calculation of the target depth is then determined as follows:

The horizontal cursor 15 is positioned with the horizontal mark 15a intersecting the 200 foot mark on the ray chart. The transducer slide 30 is positioned so that the 400 foot mark on the scale 32 (actually 600 feet below the water surface) intersects the —1° gradient curve on the chart 20. The target slide 40 is then moved until the vertical line of the target depth scale 41 intersects the 7 kiloyard mark on the range scale 31 of the transducer slide 30. The depth of the target is indicated at the point where the —1° gradient curve on the chart 20 intersects the target depth scale 41 on the slide 40. Here, the —1° gradient curve intersects the target depth scale at 500 feet below the isothermal layer which indicates that the target is located at 700 feet below the surface of the water.

III. *Determination of ensonified area*

In the determination of the area covered by a particular transducer (ensonified area) only the transducer slide 30 and area coverage slide 35 are used combination with the ray chart 20. In order to simplify the explanation of the use of the slide rule in this type of calculation, drawings of a more graphic nature are utilized. These are shown by FIGS. 6a, 6b, 7a and 7b.

Let it be assumed that the bathythermograph provides an isothermal layer depth of 200 feet and a negative gradient such as —1° per 100 feet. Also the transducer is positioned 50 feet below the surface of the water. The calculation of the area ensonified by this arrangement is calculated as follows with reference to FIG. 6a:

The horizontal cursor, not shown, is positioned with the line 15a intersecting the 200 foot mark on the transducer depth scale 40. The area coverage slide 35 is moved vertically to position the point of the intersecting rays 35a on that position on the transducer depth scale 32 which is representative of the depth of the transducer; here 50 feet below the surface of the water or 150 feet on the scale 32. The area of ensonification is the shaded area 60a which is bouned by the surface of water, the 0° ray curve on the area coverage slide 35 and the 0° ray curve on the ray chart 20.

When the transducer is placed below the isothermal layer and not in the isothermal layer as described with reference to FIG. 6a, the calculation as demonstrated in FIG. 6b is utilized. Here let it be assumed that the transducer is placed at 300 feet below the surface of the water which is 100 feet below the isothermal layer. In calculating and determining the area of ensonification the area coverage slide 35 is positioned so that the point 35a is positioned at the depth of the transducer—here, 100 feet below the 0 foot mark on the scale 32. The area ensonified is that area shown generally at 60b and which is bounded by the —1° gradient curve on the chart 20 and the —1° ray curve on the slide 35.

IV. *Determination of best depth for transducer*

The calculation for the determination of the best depth to place the transducer in order to obtain the maximum area of coverage of the transducer is illustrated graphically with reference to FIGS. 7a and 7b. Here, as discussed with reference to FIGS. 6a and 6b, the area coverage slide 35, the ray chart 20, and the transducer slide 30 are the elements utilized in this calculation.

Again let it be assumed that the bathythermograph provides information that the layer depth is 200 feet and there is a negative gradient of 1° per 100 feet of depth. Also, let it be assumed that the beam width of the transducer utilized is identical to the beam width indicated by the broken lines 35b on the area coverage slide 35. The best depth is obtained in the following manner with reference to FIGS. 7a and 7b:

The area coverage slide 35 and the transducer slide 30 are both moved until the upper limiting line of the beam width angle is tangent to the —1° gradient curve on the chart 20. As viewed in FIG. 7a the area coverage slide 35 is positioned with the transducer at a point on the scale 32 fifty feet below the isothermal layer or 250 feet below the surface. In this position the upper limiting line of the beam width angle 35b on the area coverage slide 35 is not tangent to the —1° gradient curve on a ray chart. Therefore, the ensonified area is of only small dimension as indicated at 70a and the transducer is not at the most effective or best depth.

FIG. 7b illustrates the proper positioning of the area coverage slide 35 and the transducer slide 30. The upper limiting line of the beam width angle is tangent to the —1° gradient curve and the area ensonified is illustrated at 70b. The depth at which this ensonification takes place may be read from the transducer depth scale 32; here 150 feet below the isothermal layer or 350 feet below the surface of the water. Therefore, the best depth under the conditions set forth above to dip the transducer is 350 feet below the surface of the water. The area ensonified (70b) is that area bounded by the —1° gradient curve on the ray chart 20 and the —1° curve of the area coverage slide 35. As viewed in FIG. 5 the best depth for the transducer is directly indicated and occurs where the —1° gradient curve on the area coverage slide 35 intersects the depth scale 32.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A slide rule for use in sonar operations which employs underwater transducers to locate underwater target comprising:
   a frame,
   a chart positioned in said frame, said chart having on the face thereof a family of positive gradient curves and negative gradient curves representing the actual path of acoustic rays in water, a horizontal axis disposed approximately centrally of said chart and dividing the positive gradient curves from the negative gradient curves, a vertical axis disposed approximately centrally of said chart and passing through the apex of each of said positive and negative gradient curves and resulting in the curves on one side of said chart being a mirror image of the curves on the other side of said chart, a first slide movably positioned in said frame, said first slide having a vertically extending graduated scale on the face thereof indicative of the depth of the target and cooperating with said curves on said other side of said chart, and a second slide movably positioned in said frame, said second slide having a vertically extending graduated scale on the face thereof indicative of the depth of the transducer and cooperating with said curves on said one side of said chart, said second slide including a horizontally extending graduated scale on the face thereof indicative of the range of the target for intersection with the vertically extending graduated scale on the face of said first slide.

2. The slide rule as defined in claim 1 further including a horizontal cursor movably secured to said frame and having a line on the face thereof indicative of the surface of the water.

3. A slide rule for use in sonar operations which employs underwater transducers to locate underwater target comprising:

a frame, a chart positioned in said frame, said chart having on the face thereof a family of curves representing the actual path of acoustic rays in water having a particular temperature range, a first slide movably positioned in said frame, said first slide having a vertically extending graduated scale on the face thereof indicative of the depth of the target, and a second slide movably positioned in said frame, said second slide having a vertically extending graduated scale on the face thereof indicative of the depth of the transducer and a horizontally extending graduated scale on the face thereof indicative of the range of the target for intersection with the vertically extending graduated scale on the face of said first slide, said second movable slide including a third slide secured thereto for sliding movement along said vertically extending transducer depth scale, said third slide having a family of curves on the face thereof representing the actual path of acoustic rays and identical to those marked on said chart.

4. The slide rule as defined in claim 3 wherein said third slide has indicia thereon representative of the beam width of the particular transducer being utilized.

5. The slide rule as defined in claim 4 wherein said curves and beam width indicia on said third slide are superimposed over said vertically extending transducer depth scale.

References Cited by the Examiner
UNITED STATES PATENTS

| | | | |
|---|---|---|---|
| 2,434,306 | 1/1948 | Wood | 235—70 X |
| 2,494,536 | 1/1950 | Atwood. | |
| 2,544,224 | 3/1951 | Hachmuth. | |
| 3,162,363 | 12/1964 | Lavie | 235—61 X |

RICHARD B. WILKINSON, *Primary Examiner.*

LEO SMILOW, LOUIS J. CAPOZI, *Examiners.*

C. G. COVELL, J. G. MURRAY, *Assistant Examiners.*